United States Patent
Tenkumo

[15] 3,698,304
[45] Oct. 17, 1972

[54] SHUTTER RELEASE CONTROL MECHANISM

[72] Inventor: Shohei Tenkumo, Osaka, Japan

[73] Assignee: Minolta Camera Kabushiki Kaisha, Osaka, Japan

[22] Filed: March 3, 1970

[21] Appl. No.: 16,010

[30] Foreign Application Priority Data

March 6, 1969 Japan ..................44/19502
March 10, 1969 Japan ..................44/20631
March 10, 1969 Japan ..................44/20632

[52] U.S. Cl. .............................95/53 EB, 95/53 E
[51] Int. Cl. ..........................................G03b 9/08
[58] Field of Search ..............95/53 R, 53 EB, 55

[56] References Cited

UNITED STATES PATENTS

| | | |
|---|---|---|
| 3,191,511 | 6/1965 | Burgarella et al..........95/55 X |
| 3,349,678 | 10/1967 | Suzuki et al..........95/53 EB X |
| 3,498,195 | 3/1970 | Ono.....................95/53 EB X |
| 3,249,034 | 5/1966 | Burgarella et al....95/53 EB X |

*Primary Examiner*—Samuel S. Matthews
*Assistant Examiner*—R. E. Adams
*Attorney*—Watson, Cole, Grindle & Watson

[57] ABSTRACT

An electrically controlled shutter mechanism has a shutter closing member movable between a cocked and a rest position with an armature actuated by an electromagnet controlled by an electric timing circuit for holding the shutter closing member in the cocked position. A mechanism engages the shutter closing member and biases it in the rest position and additional structure moves the shutter closing member to the cocked position and moves the armature into contact with the electromagnet. The aforesaid mechanism is moved by the shutter opening member to cock the aforesaid additional structure while the armature engages the electromagnet so as to cause the armature to be pressed against the electromagnet with the shutter opening member locked in the cocked position.

7 Claims, 7 Drawing Figures

PRIOR ART FIG. 1
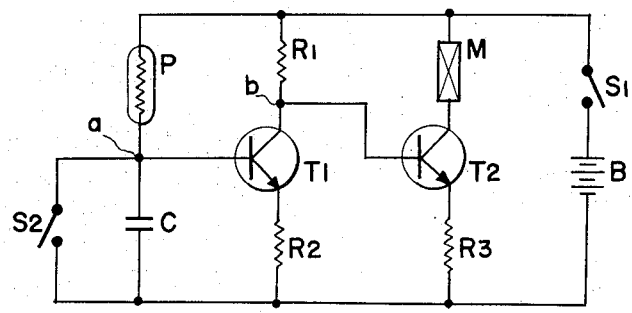
PRIOR ART FIG. 2
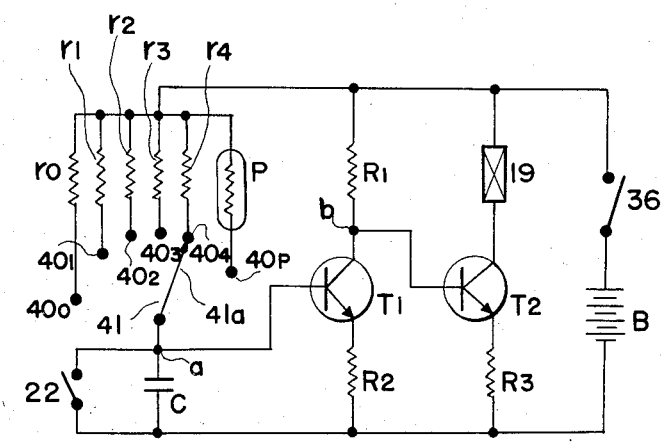

A SHUTTER RELEASE CONTROL MECHANISM

BACKGROUND OF THE INVENTION

The present invention relates to photographic cameras having an electrically controlled shutter and, more particularly, to such cameras wherein the shutter is held open by an electromagnet and the closing of the shutter is effected by the demagnetization of the electromagnet controlled by an electronic control circuit.

A shutter of this kind has the advantage of that it is possible to obtain a precise delay time by means of an electric delay circuit of simple construction. However, the operational system of shutter thereof is normally carried into effect mechanically, so that the mechanical errors, including the electromechanical converting portion, and the unstability of the system have an important effect in lowering the performance of the apparatus.

As a most important element thereof, is the is uneven or uncertain, on said electromagnet residual magnetism of the electromagnet, and when the exciting current is shut off a counter electromotive voltage is produced so that the time required for the armature to separate from the electromagnet is unstable. And in addition, an error due to the instability of the starting position of the driving members for opening and closing the shutter causes further problems.

SUMMARY OF THE INVENTION

The present invention removes the aforementioned drawbacks with apparatus comprising an armature mounted on a shutter closing member, an electromagnet for attracting the armature while being excited to prevent the shutter from closing and for releasing the shutter when demagnetized by an electric control circuit. An intermediate member having an engaging means for engaging with the shutter closing member is provided with a spring bias. A shutter opening member operates the intermediate member when it is moved to the cocked position by a cocking member. The movement of the intermediate member moves the shutter closing member to the cocked position, and even after the armature comes into contact with the electromagnet, the intermediate member is movable with the shutter opening member in the same direction until the shutter opening member is locked in its cocked position while cocking the spring. The energy of the cocked spring presses the armature into complete contact with the electromagnet with a certain pressure, and thereby exposure error due to the incomplete contact between them is prevented.

The second object of the present invention is to provide an improved structure of the aforementioned type wherein the precise delay time established by an electrical control circuit is unaffected by the shutter opening and closing mechanism.

BRIEF DESCRIPTION OF THE DRAWINGS

FIG. 1 shows an example of electric shutter control circuits well known in the prior art.

FIG. 2 shows an embodiment of the electric shutter control circuit used in the present invention.

DESCRIPTION OF THE PREFERRED EMBODIMENT

Figure 3:
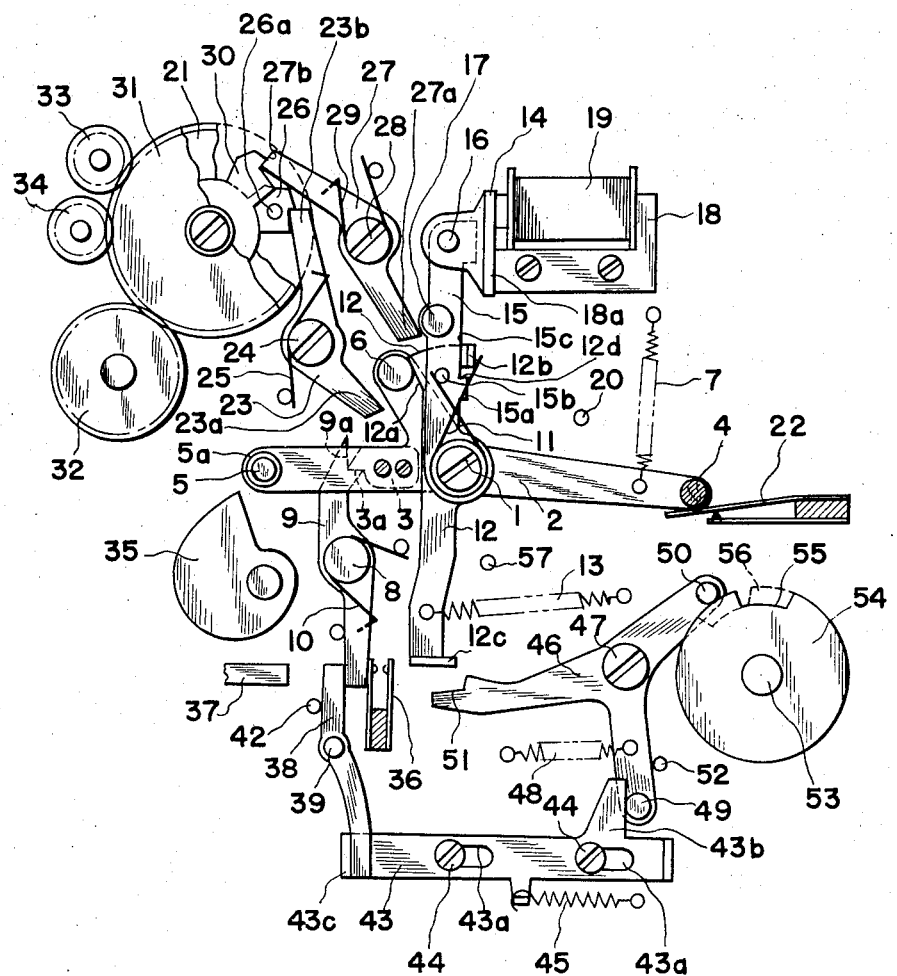
FIG. 3 is a top view showing the entire structure of an embodiment in accordance with the present invention, at the time when the shutter cocking is completed.

The preferred embodiment shown in the drawings is applied to a focal plane shutter, and FIG. 1 shows a general electric delay circuit well known in the prior art, wherein electric power switch $S_1$, photoconductive element P, and condenser C form a series circuit with electric power source B A shunt circuit having timing switch $S_2$ in parallel with condenser C is connected to the series circuit. The junction between photoconductive element P and condenser C is connected to the base of first transistor $T_1$, and one end of adjustable resistance $R_1$ in the collector circuit of the first transistor $T_1$ is connected to the positive side of the power source and the other side $b$ is connected to the base of second transistor $T_2$. The collector circuit of second transistor $T_2$ is connected to electromagnet M.

The electric delay circuit used in the present invention is the same in principle as the circuit described above, and as shown in FIG. 2 resistances $r_0, r_1, r_2, r_3, r_4$ and photoconductive element P, connected in parallel with each other, are respectively connected in series to electric power source B through power switch 36. Respective terminals $40_0, 40_1, 40_2, 40_3, 40_4, 40_p$, and contact piece $41_a$ of change over switch 41 connected by movement of the contact element. Change over switch 41 is connected to power source B through condenser C, and to this condenser a short-circuit circuit having a timing switch 22 is connected in parallel.

Connecting point $a$ between change over switch 41 and condenser C is connected to the base of first transistor $T_1$ and the collector circuit of first transistor $T_1$ is connected to the positive side of the power source through adjustable resistance $R_1$. One end of adjustable resistance $R_1$ is connected to the base of second transistor $T_2$ and the collector circuit of second transistor $T_2$ is connected to the positive side of the power source through electromagnet coil 19. R2, R3 are adjusting resisters.

Resistances $r_1, r_2, r_3, r_4$ are connected to condenser C through change over switch 41 and serve respectively as a set resistance which delays the exposure time. And, resistance $r_0$ has a resistance value for obtaining the delay time for arresting mechanically the driving of the shutter closing lever during a bulb exposure described hereinafter. Photoconductive element P is provided in order to effect an automatic exposure for setting the exposure time in accordance with the brightness of an object.

Now, as shown in FIG. 2 provided change over switch 41 is connected to resistance $r_4$ and power switch 36 is closed, the exciting current runs through electromagnet 19 to excite it.

By opening timing switch 22 in interlocking with the open operation of the shutter, the current running through set resistance $r_4$ charges condenser C, and when the voltage at point $a$ gets to a certain voltage first transistor $T_1$, which has been OFF until then, turns ON and the voltage at point $b$ drops through adjustable resistance $R_1$. Second transistor, which has been ON till then, turns OFF, therefore, the exciting current is stopped and electromagnet 19 is demagnetized.

Figure 7:
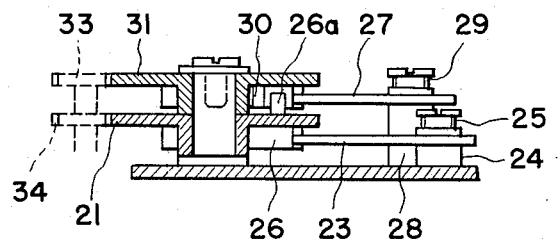
FIG. 7 is a side view in longitudinal section of the embodiment shown in FIG. 3.

FIG. 3 and FIG. 7 show the formation of the electromechanical and the mechanical structure, wherein on shaft 1 fixed to the camera body there are fitted loosely shutter opening lever 2, intermediate lever 12, and shutter closing lever 15. Intermediate lever 12 is provided with riser 12b for engaging with side edge 15e of shutter and closing lever 15 and that lever is also provided with step 15a for engaging with side edge 12d of intermediate lever 12, and the mutual motion between both levers is restricted with some freedom left and there is provided between them coupling spring 11 for absorbing the over cooking action. Thereby, riser 12b and side edge 15e of shutter closing lever 15 are arranged to come into contact with each other so as to absorb the clockwise over cocking of intermediate lever 12.

On the other side edge of intermediate lever 12 abutment surface 12a is formed, and on the other arm of intermediate lever 12 driving spring 13 is provided between the camera body to provide a strong counterclockwise turning tendency to intermediate lever 12 and shutter closing lever 15. On the lower end of intermediate lever 12 there is formed piece 12c for engaging with the jaw of the arresting lever during a bulb exposure as described hereinafter.

On shutter closing lever 15 kick pin 17 is mounted, and onto the end thereof armature 14 is connected at a small angle of elevation by means of pin 16. When intermediate lever 12 is turned clockwise against the force of spring 13 the armature is connected to shutter closing lever 15 and turned clockwise together with intermediate lever 12 to come into contact with abutment surface 18a of core 18 of electromagnet 19 fixed to the camera body.

On one arm of shutter opening lever 2 there is provided between the camera body open driving spring 7 to provide a counter-clockwise turning tendency to lever 2. On the end of arm 2 there is provided insulating pin 4 facing timing switch 22. And, on the second arm of driving lever 2 there are provided fixedly restraining plate 3 having pawl 3a and fixed pin 5 for fitting loosely in roller 5a. On the third arm of driving lever 2 there is provided working pin 6 so as to come into contact with abutment surface 12a of intermediate lever 12.

Cocking cam 35 is connected rotatably to the camera body so as to turn only counterclockwise and is rotated once by means of the winding mechanism, not shown in the drawings, to press roller 5a provided on open operation driving lever 2 into contact with cocking cam 35 so as to turn driving lever 2 clockwise against driving spring 7 to cock it.

Release lever 9, having a clockwise turning tendency through spring 10, is mounted rotatably to the camera body by means of pin 8, and one arm of release lever 9 faces the movable contact piece of power switch 36 as shown in FIG. 2 and also faces manually operated release rod 37 through connection lever 38 which is connected rotatably to the camera body by means of pin 39. On the other arm of release lever 9 there is formed claw 9a for engaging with pawl 3a of arresting plate 3. There is also pin 24 for rotatably connecting restraining lever 23 having a counterclockwise turning tendency through spring 25. One arm 23a of restraining lever 23 comes into the turning track of working pin 6 of shutter opening lever 2, and pawl 23b of the other arm thereof comes into the turning track of restraining plate 26 meshed with screen driving gearing 21 connected by a pin to the camera body. In the same manner, one end 27a of restraining lever 27 is connected rotatably to the camera body by means of pin 28 and has a counterclockwise turning tendency through spring 29 and comes into the turning track of kick pin 17 provided on shutter closing lever 15. Pawl 27b of the other arm comes into the turning track of restraining plate 30 meshed with gearing 31 and coaxial with gearing 21 and supported on the upper side of gearing 21.

Figure 6:
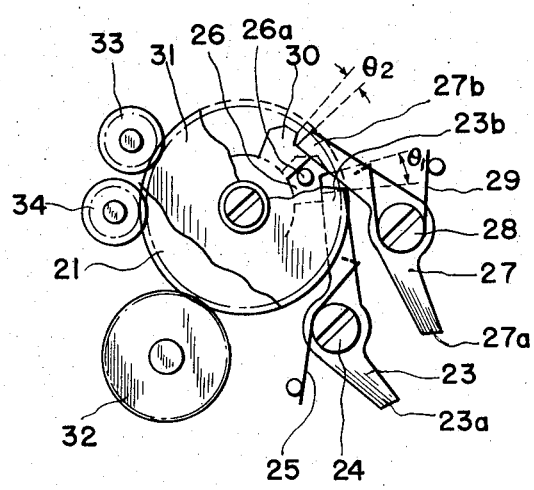
FIG. 6 is a partial top view enlarged showing the relative positions of the shutter operational system and the restraining member, at the time when the shutter winding is finished in the embodiment shown in FIG. 3.

Gearing 32 is rotated during the winding operation in interlocking relationship with cocking cam 35 and meshes with gearing 21. Pin 26a provided on restraining plate 26 engages with restraining plate 30, and thereby both screen driving gears 21 and 31 are rotated during the winding operation. And, at the final stage of winding, as shown in FIG. 6, both restraining plates 26, 30 are designed to over-cock respectively at angles $0_1$, $0_2$ to pawls 23b and 27b so that $0_1$ is larger than $0_2$. Thereby, the stable engagement of both restraining plates and both restraining levers is positively ensured and also the starting positions and the starting states of both screen gears 33, 34 meshing with both screen driving gearings 21, 31 respectively are also stable.

Pins 20 and 57 are respectively a grading pin for restricting the counterclockwise turning motions of shutter opening lever 2 and intermediate lever 12, and pin 42 is a grading pin for restricting the counterclockwise turning of connection lever 38 of them are planted directly on the camera body.

Sliding plate 43 having guide pin 44 mounted on the camera body is fitted in long slot 43a and is pulled to the right as shown in FIG. 3 by means of spring 45. Riser 43c on the left end thereof engages with connection lever 38, and protrusion 43b is provided upwardly thereon.

Check lever 46 is fitted loosely in pin 47 and mounted on the camera and is provided with three arms having a clockwise turning tendency through spring 48. Pin 49 provided on one arm thereof engages with protrusion 43b provided on sliding plate 43 to assume a counterclockwise turning position through spring 45 provided on sliding plate 43 and against spring 48 to come into contact with grading pin 52. And, pin 50 mounted on the second arm of check lever 46 comes into contact with the shutter speed change over disk 54, namely, a lock member described hereinafter, and notch restraining portion 51 formed on the third arm of check lever 46 are made to come into the turning track of member 12c on lower end of intermediate lever 12 so as to engage with member 12c when turned clockwise.

Shutter speed change over disk 54 is connected to the camera body by pin 53, and pin 50 provided on the second arm of check lever 46 slides in contact with the perimeter of pin 53 and on a portion of that perimeter step 55 is formed. Shutter speed change over disk 54 interlocks with change over switch 41 shown in FIG. 2, and when contact piece 41a of switch 41 is connected with contact $40_0$ of resistance $r_0$, step 55 of shutter speed change over disk 54 faces pin 50 as shown by a broken line in FIG. 3. Shutter release rod 37 is moved to the right and when sliding plate 43 is moved to the left against spring 45 by connection lever 38, pin 50 drops down into step 55 and notch restraining portion 51 comes into the turning track of member 12c of intermediate lever 12 to engage therewith to restrain it. When contact piece 41a of change over switch 41 is connected by contact $40_1$, $40_2$, $40_3$, or $40_4$ to other resistance $r_1$, $r_2$, $r_3$, or $r_4$, or contact $40_p$ of photoconductive element P, step 55 is displaced from the position facing pin 50, and pin 50 is restrained by the perimeter of shutter speed change over disk 54, and even though sliding plate 43 is moved to the left through the shutter release operation, the clockwise turning of check lever 46 does not take place.

Since the present invention is formed as described above, upon carrying out the winding operation, charge cam 35 is turned counterclockwise and its cam surface presses roller 5a on shutter opening lever 2 to turn lever 2 clockwise against driving spring 7. And at the same time, working pin 6 contacts with abutment surface 12a of intermediate lever 12 to turn intermediate lever 12 clockwise against driving spring 13 and simultaneously also turn shutter closing lever 15 clockwise and thus armature 14 comes into contact with abutment surface 18a of core 18.

By the above rotation, pawl 3a of restraining plate 3 passes over claw 9a of release lever 9 so as to engage therewith, and when pawl 3a turns further clockwise armature 14 comes into contact closely with abutment surface 18a of core 18 to stop shutter opening lever 15. Intermediate lever 12 is turned clockwise while energizing spring 11 and is thereby over cocked.

In synchronization with the above operation, gear 32 is turned clockwise to turn both gears 21, 31 counterclockwise to cock the shutter through both gears 33, 34, and as described above both restraining plates 26, 30 are over cocked at a certain angle to their respective restraining levers.

Upon stopping the winding operation, pawl 3a of shutter opening lever 2, disengaged from charge cam 35, engages closely with claw 9a of release lever 9, and armature 14 is pressed into contact with the abutment of core 18 under a certain pressure by spring 11 via overcocked intermediate lever 12. Both restraining plates 26, 30 for gears 21, 31 completely engage with their respective restraining levers from the overcocked position thereof as shown in FIG. 3.

Figure 4:
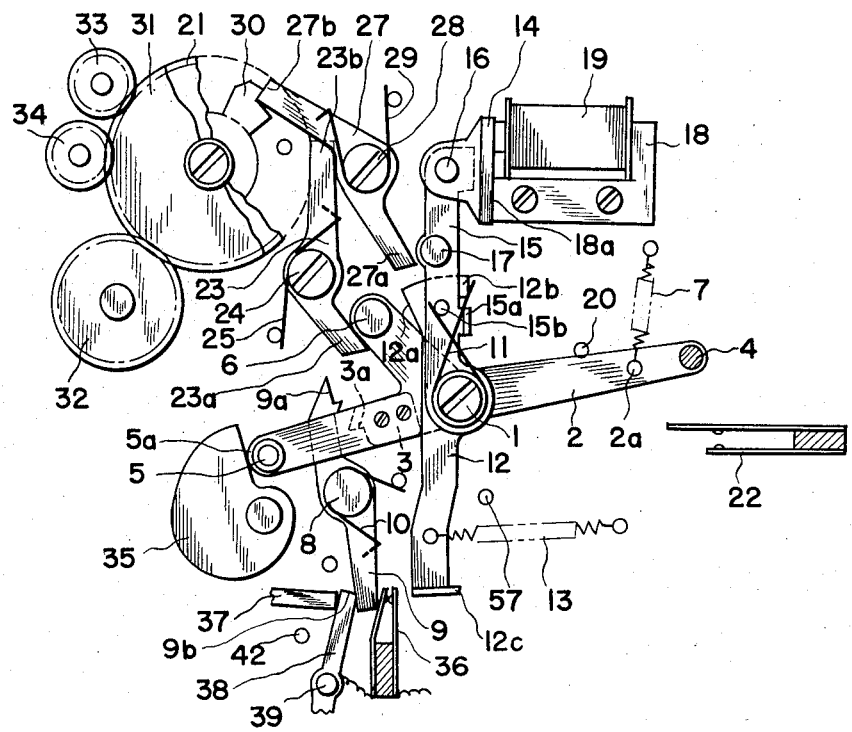
FIG. 4 is a partial top view of the embodiment shown in FIG. 3, at the time when the shutter is released and in the opening state.

In this state, upon operating release rod 37, release lever 9 is turned counterclockwise through connection lever 38, and power switch 36 is closed and electromagnet 19 is excited to attract armature 14 to abutment surface 18a of core 18 as described above. Then, the engagement of pawl 3a of restraining plate 3 and claw 9a is broken and shutter opening lever 2 is pulled by spring 7 to turn counterclockwise to release timing switch 22 simultaneously therewith working pin 6 turns restraining lever 23 clockwise to break the engagement of pawl 23b and restraining plate 26, and thereby the opening screen starts to travel to reach the position shown in FIG. 4.

Provided change over switch 41 is connected with resistance $r_1$, $r_2$, $r_3$, or $r_4$, or photoconductive element P, even through sliding plate 43 is moved to the left through connection lever 38 on account of the release operation, check lever 46 holds the position shown in FIG. 1. And, by releasing timing switch 22, condenser C is charged by the current running through resistance $r_1$, $r_2$, $r_3$, or $r_4$, or photoconductive element P, and when the voltage at point a gets to a certain threshold voltage, transistors $T_1$, $T_2$ are respectively switched and the exciting current to electromagnet 19 is shut off. Armature 14 is pressed into contact with core 18 by driving spring 13 through intermediate lever 12, and thereby it is possible to maintain constant the time from the shut-off of the exciting current to the starting of the shutter closing lever.

Figure 5:
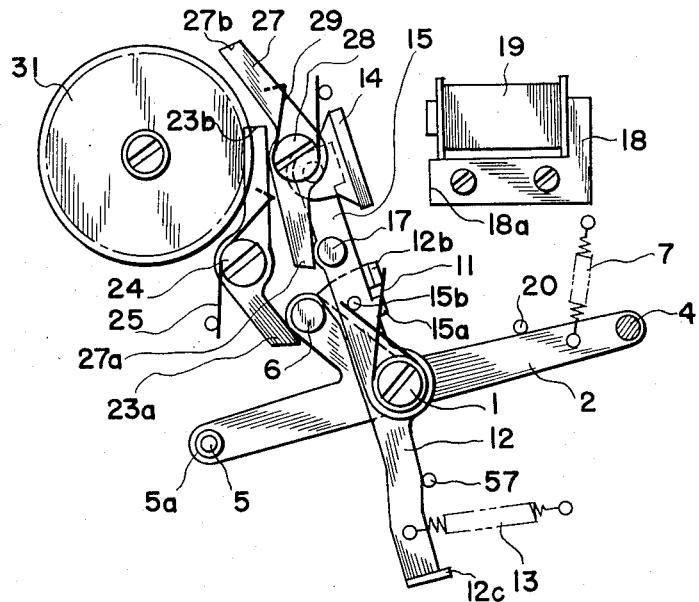
FIG. 5 is a partial top view of the embodiment shown in FIG. 3, at the time when the shutter release operation is finished.

And, because turning kick pin 17 engages with restraining lever 27 to turn it clockwise, pawl 27b of lever 27 disengages from restraining plate 30, and thus the condition shown in FIG. 5 is attained and the exposure is finished.

In the case where change over switch 41 is changed over to resistance $r_0$, since step 55 of the shutter speed change over disk 54 is facing pin 50, when sliding plate 43 is moved to the left through the release operation, check lever 46 is turned clockwise by spring 48 and notch restraining portion 51 of lever 46 comes into the turning track of member 12c.

By setting resistance $r_0$ so as to delay the time required for the mechanical displacement, second transistor $T_2$ is switched to shut off the exciting current to electromagnet 19. When shutter closing lever 15 and intermediate lever 12 start to turn, initially check lever 46 checks the turning thereof and checking is released simultaneously with the completion of the release operation, so that a bulb exposure can be carried out. Meanwhile, the time during which electromagnet 19 is being excited is minute and after that it is possible to be locked mechanically so that electric power is not wasted and electromagnet 19 is not energized, and an electromagnet of small capacity can be put to use.

I claim:

1. A photographic camera having an electrically controlled shutter mechanism comprising:
   a shutter opening member movable between a charged position and a rest position thereof;
   a biasing member for biasing said shutter opening member toward its rest position;
   a charging member for driving said shutter opening member to its charged position;
   a shutter closing member movable between a charge position and a rest position and having an armature mounted thereon;
   an electromagnetic member for holding said shutter closing member in its charged position;
   an electric timing circuit for controlling said electromagnetic member;
   an intermediate member having means for engaging said shutter closing member and biased in a direction to return the latter member to its rest position;
   operating means for drawing said shutter closing member and said intermediate member into contact with each other;

said operating means moving said shutter closing member to its charged position with said shutter opening member engaging said intermediate member and moving said armature into contact with said electromagnet;

said intermediate member being further moved by said shutter opening member to charge said operating means with said armature engaging said electromagnet, and said armature being pressed against said electromagnet by said charged operating means with said shutter opening member locked in its charged position.

2. A photographic camera with an electrically controlled shutter mechanism having a first member for shutter opening and a second member for shutter closing, comprising:

a first retaining member for retaining said first member in a cocked position;

a second retaining member for retaining said second member in a cocked position;

a first lever movable between a charged position and a rest position to release said first retaining member;

a biasing member for urging said first lever toward said rest position;

a charging member for driving said first lever to said charged position;

a locking member for locking said first lever in its charged position;

a second lever movable between a charged position and a rest position to release said second retaining member;

an armature mounted on said second lever;

an electromagnetic member for attracting said armature and holding said second lever in its charged position;

an electric timing circuit for controlling the energization of said electromagnetic member;

an intermediate lever having means for engaging said second lever and biased to return said second lever to said rest position and to release said second member;

operating means for drawing said second lever and said intermediate lever into contact with each other;

said first operating lever engaging said intermediate lever to move said second lever to its charged position and move said armature into contact with said electromagnet;

said intermediate lever being further moved by said first lever to charge said operating means with said armature contacting said electromagnet;

said armature being pressed against said electromagnet by said operating means with said first lever locked in its charged position; and a member for releasing the locking of said first lever in response to shutter release operation.

3. A shutter mechanism as set forth in claim 2, further comprising:

exposure time setting means movable to a plurality of different exposure time settings including a bulb exposure position;

a shutter release member moved between a rest position and an operation position;

a third lever movable to a position for preventing said second lever from releasing said second retaining member;

interlocking means for moving said third lever to said position in response to movement of said shutter release member from said rest position to said operating position and holding said third lever in that position as said shutter release member is in said operating position; and means for permitting movement of said third lever only with said exposure time setting means set to said bulb exposure condition.

4. A shutter mechanism as set forth in claim 3, wherein:

said electric timing circuit includes an RC delay circuit having a variable resistor means set by said exposure time setting means, said variable resistor means is set to a value whereby said electromagnet is continuously excited until said third lever is moved to said position.

5. A shutter mechanism as set forth in claim 2, wherein said electrical timing circuit includes a power switch and a timing switch connected to a delay circuit, and said timing switch is operated by said charging member.

6. A photographic camera as set forth in claim 2 further comprising means for winding said charging member, wherein said charging member is a rotatable gear and said first and second retaining members are mounted thereto.

7. A shutter mechanism as set forth in claim 3, wherein said third lever is engageable with said intermediate lever at said position.

* * * * *